United States Patent
Kampf

(12) 
(10) Patent No.: US 6,449,974 B1
(45) Date of Patent: Sep. 17, 2002

(54) AIR-CONDITIONING SYSTEM FOR A MOTOR VEHICLE

(75) Inventor: Hans Kampf, Korb (DE)

(73) Assignee: Behr GmbH & Co., Stuttgart (DE)

( * ) Notice: Subject to any disclaimer, the term of this patent is extended or adjusted under 35 U.S.C. 154(b) by 0 days.

(21) Appl. No.: 09/891,125

(22) Filed: Jun. 26, 2001

(30) Foreign Application Priority Data

Jul. 25, 2000 (DE) .......................................... 100 36 038

(51) Int. Cl.⁷ ................................................ B60H 1/32
(52) U.S. Cl. ...................................... 62/244; 62/324.1
(58) Field of Search ..................... 62/231, 244, 324.1

(56) References Cited

U.S. PATENT DOCUMENTS

| | | | | |
|---|---|---|---|---|
| 4,711,094 A | * | 12/1987 | Ares et al. .................. | 62/196.4 |
| 4,761,967 A | * | 8/1988 | Sumikawa et al. .......... | 165/140 |
| 5,910,157 A | * | 6/1999 | Noda .......................... | 165/43 |
| 5,975,191 A | * | 11/1999 | Ohashi et al. ................. | 165/43 |

FOREIGN PATENT DOCUMENTS

| | | |
|---|---|---|
| DE | 38 20 811 A1 | 12/1989 |
| DE | 39 07 201 A1 | 9/1990 |
| DE | 40 28 787 C1 | 8/1991 |
| DE | 198 55 309 | 6/2000 |
| EP | 0 870 632 A2 | 10/1998 |
| EP | 0 960 756 A1 | 12/1999 |

* cited by examiner

Primary Examiner—William E. Tapolcai
(74) Attorney, Agent, or Firm—Foley & Lardner

(57) ABSTRACT

An air-conditioning system for a motor vehicle has a circuit (14) which is capable of being changed over from cooling to heating. The system has a heater (22), through which the air to be conditioned flows, a cooling heat exchanger (18) acting as an evaporator in the cooling mode, and an additional heat exchanger (20) capable of being selectively used for providing auxiliary heat in the heating mode. The additional heat exchanger can be advantageously utilized by operating it as an auxiliary cooling heat exchanger, acting as an evaporator, in the cooling mode.

15 Claims, 3 Drawing Sheets

AIR-CONDITIONING SYSTEM FOR A MOTOR VEHICLE

BACKGROUND OF THE INVENTION

The present invention relates to an air-conditioning system of a motor vehicle and to a method for operating the air-conditioning system.

DE 198 55 309 discloses an auxiliary heating device, in which an air-conditioning system is not only used for cooling, but also for heating. Thus, for example in the heating mode, the refrigerant of the air-conditioning circuit is routed along a branched-off line, bypassing the condenser. The evaporator then serves, in this heating mode, as a heat emitting heat exchanger which transmits the heat generated in the compressor to the air to be heated. In the normal cooling mode, the evaporator serves for cooling the air, usually taking it below the dew-point temperature, so that the moisture present in the air condenses out on the evaporator. When there is a changeover to the heating mode, this condensation water will evaporate and enter the vehicle interior, with the result that, in particular, windshield fogging may occur. This is referred to by what is known as "flash fogging". One provision to avoid this windshield fogging, according to DE 198 55 309, is for different heat exchanger surfaces to be provided for cooling and for heating. These different heat exchanger surfaces may be assigned to different heat exchangers, so that an evaporator may be provided for the cooling mode and an additional heat exchanger for the additional heating mode.

Such an air-conditioning system, in which an additional heat exchanger serving for heating the air is provided in the refrigerant circuit, is also known from DE 39 07 201.

The disadvantage of these known air-conditioning systems is that an additional heat exchanger has to be provided, in addition to the unchanged evaporator which serves exclusively for cooling the air. The additional heat exchanger requires additional construction space within the air-conditioning system. Since the construction space in present-day vehicles becomes ever more limited, an additional heat exchanger of this type has not yet found commercial application. Driving situations in which the additional heating heat exchanger will be required seldom occur, as a proportion of the total operating period of the motor vehicle. To be precise, these conditions occur mainly only during cold starting in the cold season, so that the additional gain in comfort and safety due to the additional heat exchanger cannot compensate for the disadvantages in terms of lost construction space and higher costs.

SUMMARY OF THE INVENTION

One object of the present invention is to provide an improved air-conditioning system.

A particular object resides in providing an air-conditioning system, by means of which the disadvantages mentioned can be avoided and by means of Which, in particular, the additional heat exchanger can be better utilized.

A further object of the invention is to provide an improved method for operating an air-conditioning system.

In accomplishing these objects, there has been provided in accordance with one aspect of the present invention an air-conditioning system for a motor vehicle, comprising: a refrigerant source including a compressor for providing compressed refrigerant and a first condenser; a housing for routing air that is to be conditioned; a first heat exchanger through which the air to be conditioned is capable of being selectively directed, positioned in the housing; a first evaporator positioned in the housing upstream of the first heat exchanger, the first evaporator being connected to the refrigerant source; a second heat exchanger positioned upstream of the first heat exchanger, the second heat exchanger being capable of being selectively connected to the refrigerant source; and a control circuit for the air-conditioning system, the control circuit being capable of switching between (1) a cooling mode in which the first evaporator and optionally the second heat exchanger are provided with condensed refrigerant from the refrigerant source, whereby the second heat exchanger optionally functions as an evaporator, and (2) a heating mode in which the second heat exchanger is selectively provided with compressed refrigerant from the refrigerant source and functions as a condenser.

In accordance with another aspect of the invention, there has been provided a method for operating an air-conditioning system as described above, comprising: operating the system in the cooling mode, wherein refrigerant is supplied to the second heat exchanger; switching the system to the heating mode; and after permitting lapse of a predetermined minimum period of time, supplying the second heat exchanger with compressed refrigerant.

Further objects, features and advantages of the invention will become apparent from the detailed description of preferred embodiments that follows, when considered together with the accompanying figures of drawing.

DETAILED DESCRIPTION OF THE PREFERRED EMBODIMENTS

Figure 1:
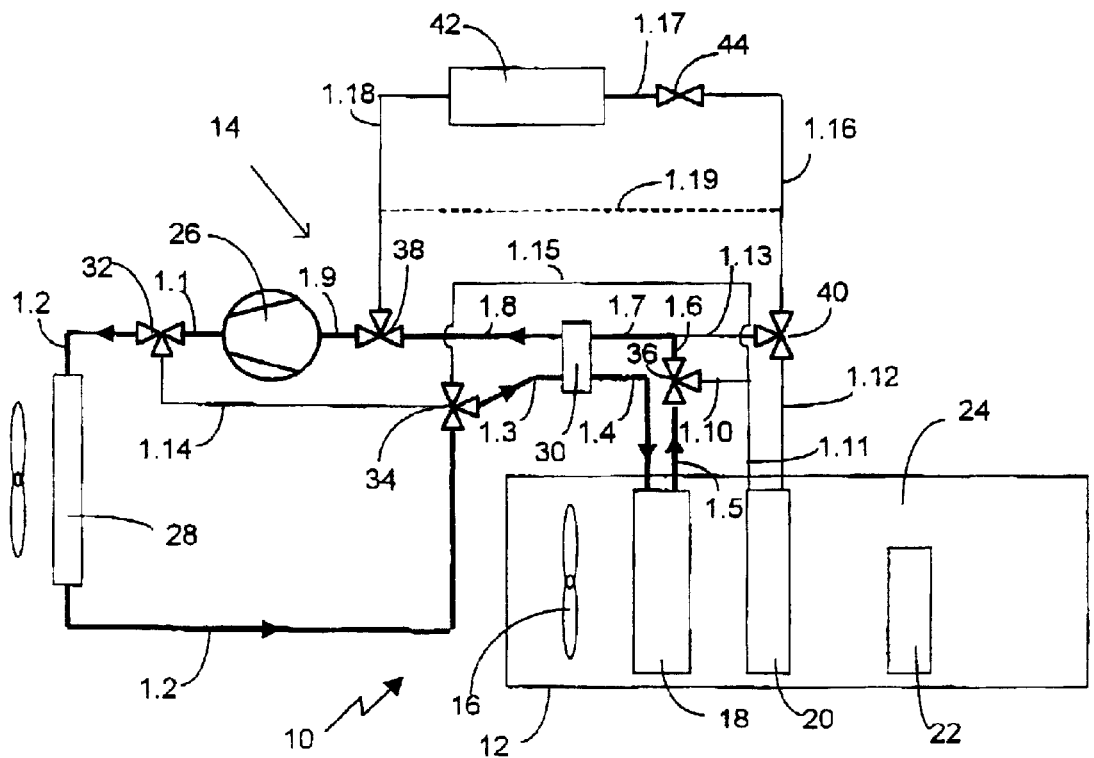
FIGS. 1 to 4 are diagrammatic illustrations showing the air-conditioning system of the invention with a refrigerating circuit in various operating states.

According to the invention, the additional heat exchanger can be operated not only in the additional heating mode, as a heating heat exchanger, but also in the cooling mode of the air-conditioning system, as an additional heat exchanger for cooling, acting as an evaporator. As a result, the additional heat exchanger can be used in a considerably more versatile way and can be provided not only as an additional heating heat exchanger in the cold season, but also can be utilized, for example, in the summer time, in the normal driving mode, as an additional cooling heat exchanger acting as an evaporator. The already existing evaporator of the air-conditioning system can then be designed with lower capacity and therefore can be smaller, so that the loss of construction space due to the additional heat exchanger, can be partially compensated by the gain in construction space of the evaporator which now has a smaller size. The heat exchanger surfaces available for cooling the air are then apportioned to a first evaporator, which can be operated solely in the cooling mode, and to a second evaporator, which, in the cooling mode, operates only in the full-load mode as an auxiliary cooling heat exchanger acting as an evaporator. It is tied into the refrigerant circuit in such a way that it can also be utilized as a heating heat exchanger. At the same time, the capacity of the first evaporator and therefore the size of this evaporator should be designed in such a way that it is sufficient for the partial-load mode at outside temperatures of between approximately 25 and 30° C. This corresponds to the temperatures occurring most frequently by far while the motor vehicle is in operation. Under climatic conditions typical for "flash fogging", this ensures that the additional heat exchanger is not used for cooling. Typical climatic conditions of this kind, under which "flash fogging" may occur, are present, for example, when the temperatures during the day amount to approximately 20° C., with morning temperatures of, for example, −5° C. Under these typical climatic conditions, however, the air-conditioning system mostly operates only in the partial-load mode, so that the additional heat exchanger is not used for cooling. Therefore, it does not have any condensation water which could be carried into the vehicle interior when it is operating as an auxiliary heating heat exchanger. In the summertime, in particular on hot days, the additional heat exchanger, acting as an evaporator, may also be used for cooling. Thus, although condensation water may be precipitated on the additional heat exchanger in this operating mode, "flash fogging" will nevertheless not occur during this time, since, firstly, the outside temperatures are so high that the condensation water dries off quickly after the vehicle has stopped and, secondly, additional heating under climatic conditions of this kind is usually not required.

In addition, however, in an advantageous method for operating the air-conditioning system according to the invention, there may be provision, after the additional heat exchanger has been in operation as a cooling an auxiliary heat exchanger, for operating it again as an auxiliary heating heat exchanger only after the lapse of a predetermined minimum time span.

The evaporator and the additional heat exchanger may advantageously be connected to one another to form a heat exchanger unit, with the result that further construction space can be saved. Extraordinary thermal stresses will not occur in the heat exchanger unit, since, when the evaporator is in operation, the additional heat exchanger is not in the heating mode and, when the additional heat exchanger is operating as an auxiliary heating heat exchanger, the evaporator will be switched off.

It is known from DE 198 55 309 and DE 39 07 201 that the evaporator and the additional heat exchanger are arranged in air flow paths running parallel, so that the air either is cooled by the evaporator or is heated by the additional heat exchanger. Since this arrangement occupies considerable construction space, however, in the air-conditioning system according to the invention the cooling and the additional heat exchanger are advantageously connected one behind the other on the airside. This is expedient, since the air routed through the evaporator and the additional heat exchanger is either cooled or heated, but not cooled and reheated. Connection of the evaporator and the additional heat exchanger in series on the air side does not increase the air pressure loss occurring due to the flow through the heat exchangers, or it is increased only slightly, since, as described above, the evaporator can be designed to be smaller because the evaporator has to furnish only a portion of the maximum cooling power.

The invention is explained in detail below by means of exemplary embodiments, with reference to the drawings.

An air-conditioning system 10 according to the invention has an air routing housing 12 and a refrigerant circuit 14. In the air routing housing 12 is arranged a blower 16 with which air can be drawn in via conventional recirculated-air and/or fresh-air vents, not illustrated, and can be conveyed through the air routing housing 12 to the interior of a motor vehicle. The air in this case flows first through an evaporator 18, in which the air can be cooled, and then through an additional heat exchanger 20, in which the air can be selectively cooled or heated, as will be described in more detail below. The air can then be heated by a heater 22, through which engine coolant preferably flows in a known manner. The air could also be routed, via a bypass 24, past the heater 22 (using air flaps, not illustrated) and be supplied to the interior at the desired temperature via conventional air outlet vents (not illustrated in any more detail).

The invention relates, in a preferred aspect, to the additional heat exchanger 20 and its connection into the refrigerant circuit 14, so that the additional heat exchanger can be operated in various operating modes. This will be described further with reference to the explanations of the various operating states of the air-conditioning system 10.

Figure 3:
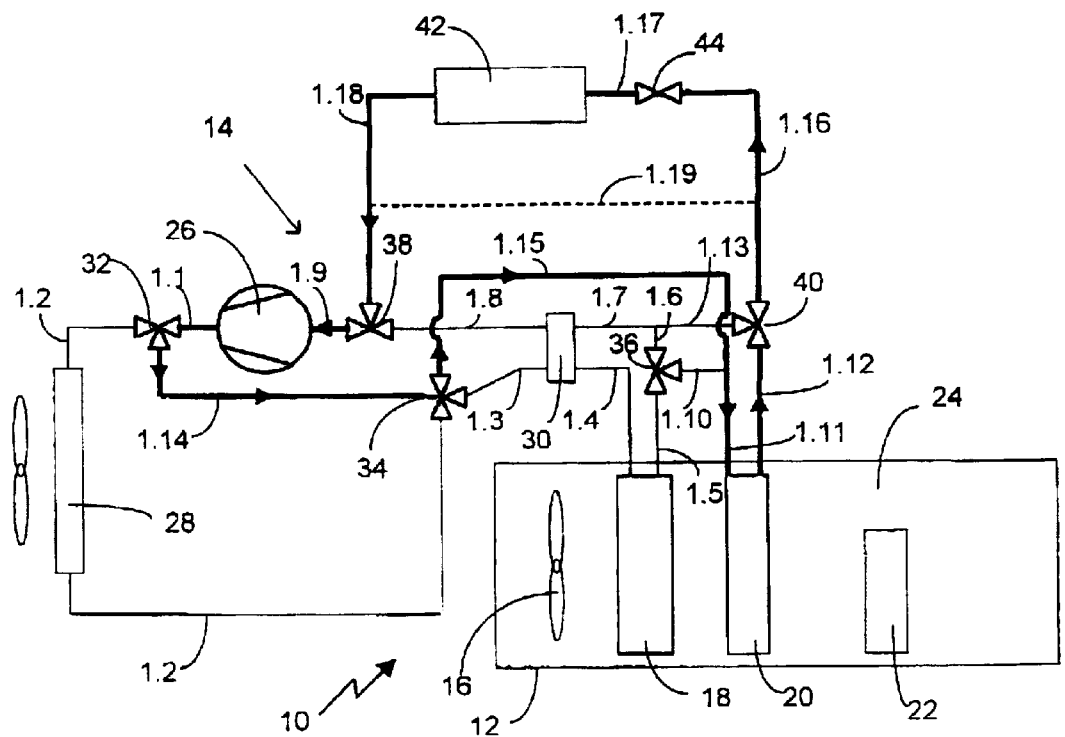
Figure 4:
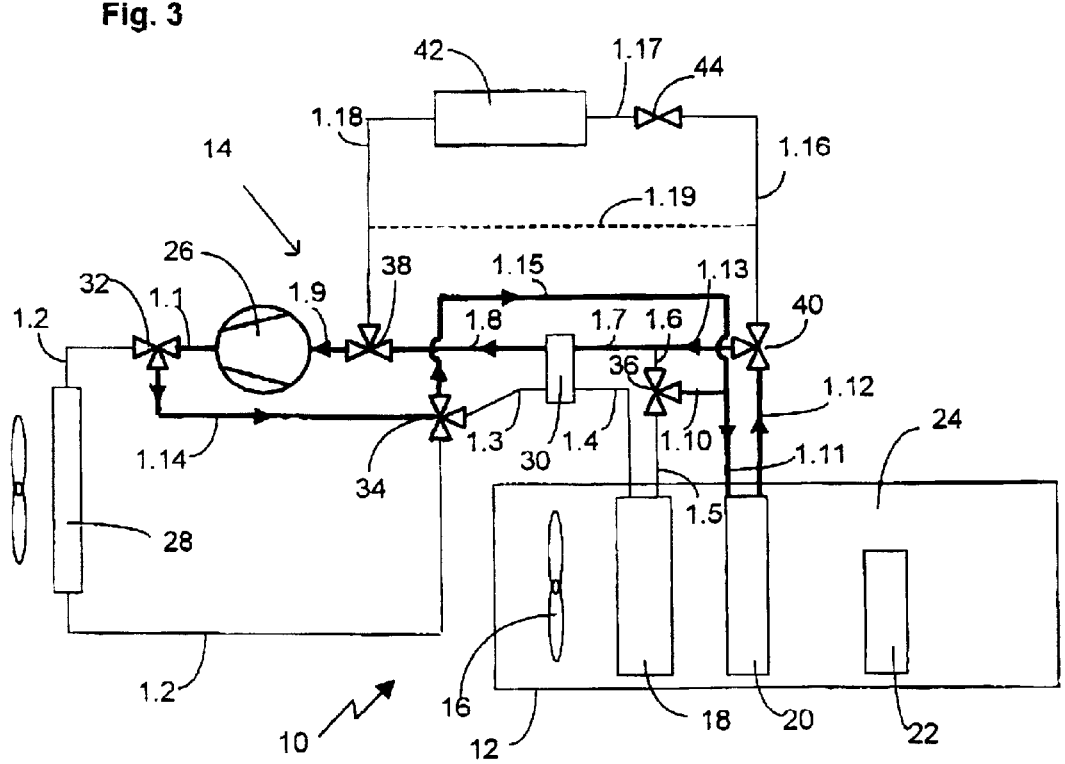

The operating states described below are:
cooling in the partial-load mode (FIG. 1)
cooling in the full-load mode (FIG. 2)
additional heating in the heat-pump mode (FIG. 3)
additional heating by means of compressor waste heat (FIG. 4)

Cooling in the partial-load mode:
In this operating mode, the refrigerant circuit 14 is connected in a known way such that a compressor 26, a condenser 28, an expansion valve 30 and the evaporator 18 are connected to one another via refrigerant lines 1.1 to 1.9, for which purpose valves 32, 34, 36, 38 are switched accordingly. This connection is illustrated in FIG. 1 by the corresponding lines (connected via the valves) being illustrated in bold. In this partial-load mode, the additional heat exchanger 20 is inoperative.

Figure 2:
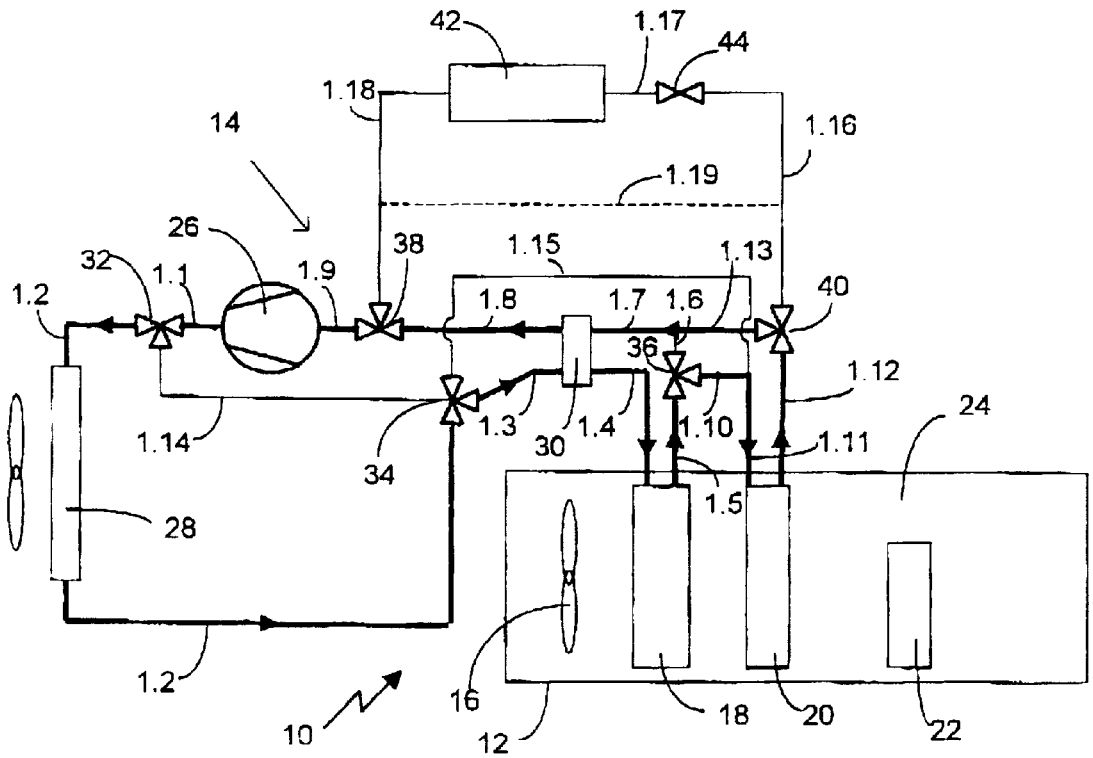

Cooling in the full-load mode:
In this operating mode, the three-way valve 36 is switched in such a way that the refrigerant, after emerging from the evaporator 18 through the line 1.5, enters the line 1.10 and is routed via the line 1.11 into the additional heat exchanger 20 and from there is routed via the line 1.12, a three-way valve 40 and the line 1.13 into the line 1.7 and consequently, via lines 1.8 and 1.9, into the compressor 26 again. This is illustrated in FIG. 2 by the bolded lines. In this operating mode, the evaporator 18 and the additional heat exchanger 20 operate as evaporators and cool the air.

Additional heating with heat pump:
In this operating mode, the condenser 28 and the evaporator 18 are bypassed. The additional heat exchanger 20 operates as a condenser, and an additional evaporator 42 is connected into the refrigerant circuit. In this case, starting from the compressor 26, the refrigerant flows through the lines 1.1, 1.14, 1.15, 1.11 into the additional heat exchanger 20, in which the refrigerant condenses and at the same time transmits heat to the air flowing through the additional heat exchanger 20. The refrigerant is routed, via the lines 1.12, 1.16, an additional expansion valve 44 and a line 1.17, into the additional evaporator 42, in which the refrigerant evaporates. The evaporated refrigerant is routed from there, via a line 1.18, the three-way valve 38 and the line 1.9, back into the compressor 26. In this operating mode, heat is extracted from the surroundings via the evaporator 42 and is transmitted at a higher temperature level, by means of the condenser, to the air to be supplied to the interior.

Additional heating by means of compressor waste heat:
In this operating mode, the air-conditioning system according to the invention operates in a similar way to its mode as a heat pump, but in this case the additional evaporator 42 is bypassed. The evaporator 42 may be bypassed either via the lines 1.6, 1.7 and 1.8 or via a separate bypass line 1.19 which is illustrated merely by dashes in FIG. 4. In this case, the refrigerant is routed from the compressor 26 into the additional heat exchanger 20, and from there is returned directly to the compressor 26, so that the heat generated in the compressor 26 can be transmitted directly to the additional heat exchanger 20. In this operating mode, the additional evaporator 42 and the additional expansion valve 44 are not necessary (and could be eliminated).

Figure 5:
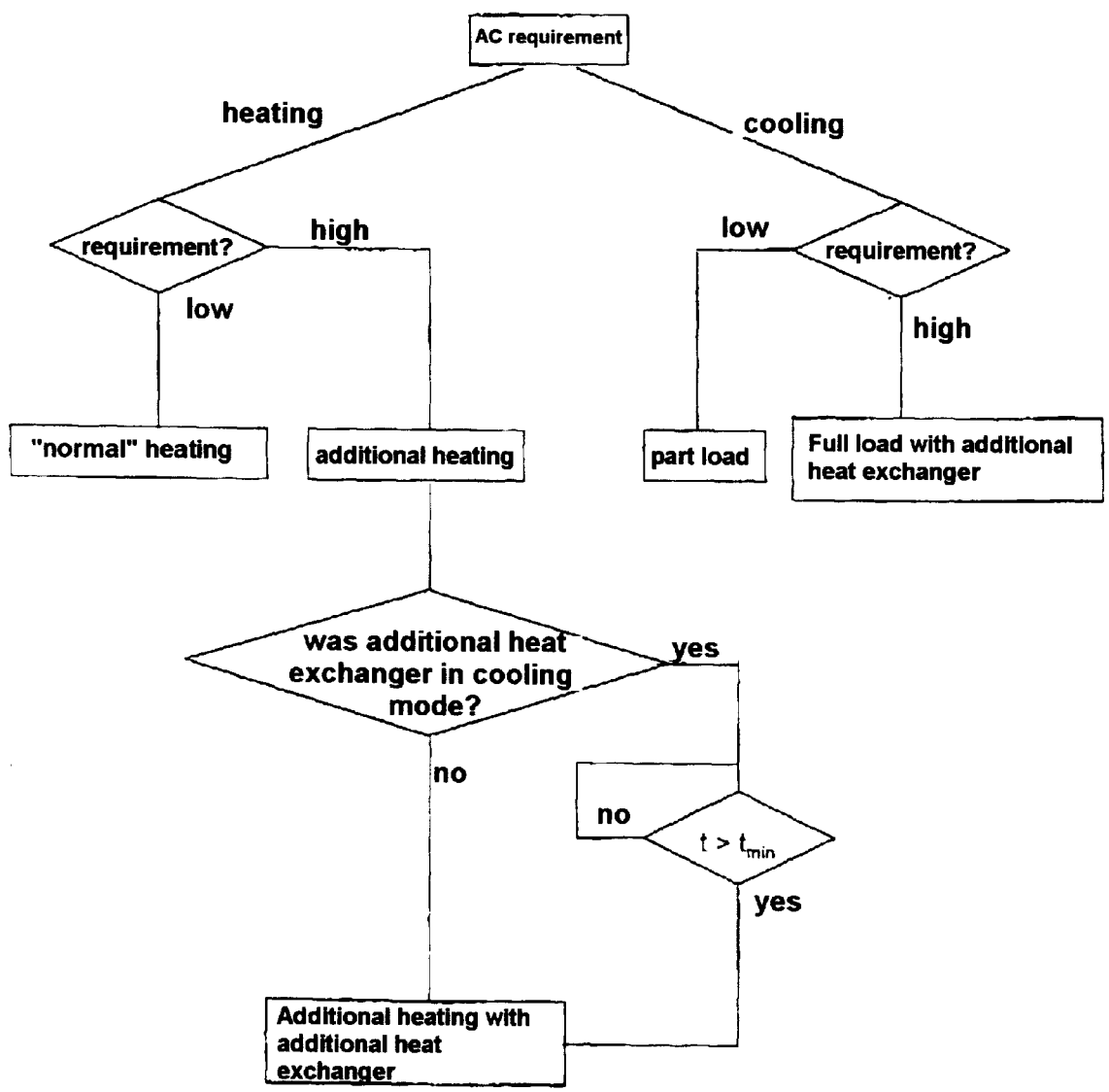
FIG. 5 is a block diagram illustrating the operation of the air-conditioning system according to the invention.

A method for operating the air-conditioning system according to the invention will be explained with reference to the flow diagram illustrated in FIG. 5. In a first step, the air-conditioning requirement is determined, that is to say whether air has to be heated or cooled. This step may take place automatically or manually by input of a control element. When the air is to be cooled, it is established, in a second step, whether there is a high or low cooling requirement. In the case of a low cooling requirement, the air-conditioning system will cool in the partial-load mode. In the case of a high cooling requirement, the air-conditioning system will operate in the full-load mode (FIG. 2). In the latter case the additional heat exchanger acts as an evaporator, and the air already cooled in the evaporator 18 is further cooled in heat exchanger 20.

When the air-conditioning system is to heat the air, the heating requirement is likewise determined in a second step. When the heating requirement is low, the additional heat exchanger 20 is not put into operation as additional heating, but, instead, the air is heated solely by the conventional heater 22. When the heating requirement is high, the additional heat exchanger 20 can be used for auxiliary heating. In this case, it must first be determined, in a further step, whether the additional heat exchanger has previously operated in the cooling mode. If this is so, it must be determined whether a predetermined minimum time span $t_{min}$ has elapsed, so that the condensation water possibly precipitated on the additional heat exchanger has been able to run off or evaporate. When this time has elapsed, the additional heat exchanger can be used for auxiliary heating in one of the operating modes described above. If the additional heat exchanger had already previously been in the heating mode, this time span $t_{min}$ does not have to elapse, and the additional heat exchanger 20 can be used immediately for auxiliary heating.

The entire disclosure of the priority application, German Patent Application No. 100 36 038.6, filed Jul. 25, 2000, is hereby incorporated by reference.

The foregoing embodiments have been shown and described for illustrative purposes only and are not intended to limit the scope of the invention which is defined by the claims. The invention includes all obvious modifications of the embodiments described above.

What is claimed is:

1. An air-conditioning system for a motor vehicle, comprising:

a refrigerant source including a compressor for providing compressed refrigerant, and a first condenser;

a housing for routing air that is to be conditioned;

a first heat exchanger through which the air to be conditioned is capable of being selectively directed, positioned in said housing;

a first evaporator positioned in said housing upstream of the first heat exchanger, said first evaporator being connected to said refrigerant source;

a second heat exchanger positioned upstream of the first heat exchanger, said second heat exchanger being capable of being selectively connected to the refrigerant source; and a control circuit for the air-conditioning system, said control circuit being switchable to select between any one of the following modes: (1) a first cooling mode in which said first evaporator is selectively provided with condensed refrigerant from the refrigerant source, (2) a second cooling mode in which said first evaporator and said second heat exchanger are provided with condensed refrigerant from the refrigerant source, whereby said second heat exchanger functions as an evaporator, and (3) a heating mode in which said second heat exchanger is selectively provided with compressed refrigerant from the refrigerant source and functions as a condenser.

2. An air-conditioning system as claimed in claim 1, wherein the first evaporator and the second heat exchanger are connected to one another to form a heat exchanger block.

3. An air-conditioning system as claimed in claim 1, wherein the control circuit in the cooling mode selectively disables the second heat exchanger at a predetermined low cooling demand level.

4. An air-conditioning system as claimed in claim 1, wherein the first evaporator and the second heat exchanger are connected in series on the air-side.

5. An air-conditioning system as claimed in claim 1, wherein the refrigerant source further comprises a second evaporator positioned outside of said housing to receive refrigerant from said second heat exchanger.

6. An air-conditioning system as claimed in claim 1, further comprising a blower positioned in the housing.

7. An air-conditioning system as claimed in claim 1, wherein said control circuit further comprises a control element for permitting lapse of a predetermined minimum period of time before supplying said second heat exchanger with compressed refrigerant when the control system is switched from said cooling mode, in which refrigerant is supplied to said second heat exchanger, to said heating mode.

8. A method for operating an air-conditioning system as claimed in claim 1, comprising:

operating said system in said cooling mode, wherein refrigerant is supplied to said second heat exchanger;

switching said system to said heating mode; and after permitting lapse of a predetermined minimum period of time, supplying said second heat exchanger with compressed refrigerant.

9. An air-conditioning system as claimed in claim 1, wherein in said first cooling mode (1), refrigerant is not supplied to said second heat exchanger.

10. An air-conditioning system as claimed in claim 1, wherein in said heating mode (3), refrigerant is not supplied to said first evaporator.

11. An air-conditioning system as claimed in claim 1, further comprising refrigerant supply lines and flow control valves arranged and operable to enable refrigerant to be selectively supplied to said first evaporator and said second heat exchanger serially or to either of said first evaporator and said second heat exchanger individually.

12. An air-conditioning system for a motor vehicle, comprising:

a refrigerant source including a compressor for providing compressed refrigerant, and a first condenser;

a housing for routing air that is to be conditioned;

a first heat exchanger through which the air to be conditioned is capable of being selectively directed, positioned in said housing;

a first evaporator positioned in said housing upstream of the first heat exchanger, said first evaporator being connected to said refrigerant source;

a second heat exchanger positioned upstream of the first heat exchanger, said second heat exchanger being capable of being selectively connected to the refrigerant source; and a control circuit for the air-conditioning system, said control circuit being capable of switching between (1) a cooling mode in which said first evaporator and optionally said second heat exchanger are provided with condensed refrigerant from the refrigerant source, whereby said second heat exchanger optionally functions as an evaporator, and (2) a heating mode in which said second heat exchanger is selectively provided with compressed refrigerant from the refrigerant source and functions as a condenser, wherein the control circuit in the cooling mode selectively disables the second heat exchanger at a predetermined low cooling demand level.

13. An air-conditioning system for a motor vehicle, comprising:

a refrigerant source including a compressor for providing compressed refrigerant, and a first condenser;

a housing for routing air that is to be conditioned;

a first heat exchanger through which the air to be conditioned is capable of being selectively directed, positioned in said housing;

a first evaporator positioned in said housing upstream of the first heat exchanger, said first evaporator being connected to said refrigerant source;

a second heat exchanger positioned upstream of the first heat exchanger, said second heat exchanger being capable of being selectively connected to the refrigerant source; and a control circuit for the air-conditioning system, said control circuit being capable of switching between (1) a cooling mode in which said first evaporator and optionally said second heat exchanger are provided with condensed refrigerant from the refrigerant source, whereby said second heat exchanger optionally functions as an evaporator, and (2) a heating mode in which said second heat exchanger is selectively provided with compressed refrigerant from the refrigerant source and functions as a condenser, wherein the refrigerant source further comprises a second evaporator positioned outside of said housing to receive refrigerant from said second heat exchanger.

14. An air-conditioning system for a motor vehicle, comprising:

a refrigerant source including a compressor for providing compressed refrigerant, and a first condenser;

a housing for routing air that is to be conditioned;

a first heat exchanger through which the air to be conditioned is capable of being selectively directed, positioned in said housing;

a first evaporator positioned in said housing upstream of the first heat exchanger, said first evaporator being connected to said refrigerant source;

a second heat exchanger positioned upstream of the first heat exchanger, said second heat exchanger being capable of being selectively connected to the refrigerant source; and a control circuit for the air-conditioning system, said control circuit being capable of switching between (1) a cooling mode in which said first evaporator and optionally said second heat exchanger are provided with condensed refrigerant from the refrigerant source, whereby said second heat exchanger optionally functions as an evaporator, and (2) a heating mode in which said second heat exchanger is selectively provided with compressed refrigerant from the refrigerant source and functions as a condenser, wherein said control circuit further comprises a control element for permitting lapse of a predetermined minimum period of time before supplying said second heat exchanger with compressed refrigerant when the control system is switched from said cooling mode, in which refrigerant is supplied to said second heat exchanger, to said heating mode.

15. A method for operating an air-conditioning system, comprising a refrigerant source including a compressor for providing compressed refrigerant, and a first condenser; a housing for routing air that is to be conditioned; a first heat exchanger through which the air to be conditioned is capable of being selectively directed, positioned in said housing; a first evaporator positioned in said housing upstream of the first heat exchanger, said first evaporator being connected to said refrigerant source; a second heat exchanger positioned upstream of the first heat exchanger, said second heat exchanger being capable of being selectively connected to the refrigerant source; and a control circuit for the air-conditioning system, said control circuit being capable of switching between (1) a cooling mode in which said first evaporator and optionally said second heat exchanger are provided with condensed refrigerant from the refrigerant source, whereby said second heat exchanger optionally functions as an evaporator, and (2) a heating mode in which said second heat exchanger is selectively provided with compressed refrigerant from the refrigerant source and functions as a condenser, said method comprising:

operating said system in said cooling mode, wherein refrigerant is supplied to said second heat exchanger;

switching said system to said heating mode; and after permitting lapse of a predetermined minimum period of time, supplying said second heat exchanger with compressed refrigerant.

* * * * *